United States Patent
Keite-Telgenbüscher et al.

(10) Patent No.: US 9,969,908 B2
(45) Date of Patent: May 15, 2018

(54) METHOD FOR REMOVING PERMEATES FROM FLAT STRUCTURES, AND CORRESPONDING ADHESIVE TAPE

(71) Applicant: TESA SE, Hamburg (DE)

(72) Inventors: Klaus Keite-Telgenbüscher, Hamburg (DE); Christian Schuh, Hamburg (DE); Thomas Schabernack, Idstein (DE)

(73) Assignee: TESA SE, Norderstedt (DE)

( * ) Notice: Subject to any disclaimer, the term of this patent is extended or adjusted under 35 U.S.C. 154(b) by 217 days.

(21) Appl. No.: 14/653,175

(22) PCT Filed: Dec. 5, 2013

(86) PCT No.: PCT/EP2013/075631
§ 371 (c)(1),
(2) Date: Jun. 17, 2015

(87) PCT Pub. No.: WO2014/095385
PCT Pub. Date: Jun. 26, 2014

(65) Prior Publication Data
US 2015/0337175 A1    Nov. 26, 2015

(30) Foreign Application Priority Data

Dec. 21, 2012  (DE) .................. 10 2012 224 319
Feb. 15, 2013  (DE) .................. 10 2013 202 473

(51) Int. Cl.
*C09J 7/00*       (2018.01)
*B32B 38/10*    (2006.01)
(Continued)

(52) U.S. Cl.
CPC ............ *C09J 7/0217* (2013.01); *B32B 38/10* (2013.01); *B32B 43/006* (2013.01); *C08K 3/22* (2013.01);
(Continued)

(58) Field of Classification Search
USPC ................ 156/247, 249, 701, 711, 712, 714
See application file for complete search history.

(56) References Cited

U.S. PATENT DOCUMENTS 5,274,036 A * 12/1993 Korpman ............... C09J 109/00
                                                                525/92 K
5,747,132 A    5/1998 Matsui et al.
(Continued)

FOREIGN PATENT DOCUMENTS

DE    19742805 A1    1/1999
DE    19913761 A1    9/2000
(Continued)

OTHER PUBLICATIONS

English language translation of Office Action in corresponding Chinese application CN 201380072121.0 dated May 30, 2016.
(Continued)

*Primary Examiner* — Sing P Chan
(74) *Attorney, Agent, or Firm* — Norris McLaughlin & Marcus PA (57) ABSTRACT

The invention relates to an easy-to-carry-out and effective method and a suitable device for absorbing permeates from flat structures. The method according to the invention comprises the following steps: gluing an adhesive tape containing at least one getter material onto the flat structure, storing the composite so obtained and consisting of the adhesive tape and the flat structure, and removing at least part of the adhesive tape which contains a getter material from the flat structure, the adhesive tape being designed to absorb at least partially at least one permeate from the flat structure. The invention further relates to an adhesive tape comprising at least one substrate layer having a water vapor permeation rate of <1 g/(m$^{2*}$d) (measured according to ASTM F-1249 at 38° C. and 90% relative humidity), to an adhesive compound and to at least one getter material arranged
(Continued)

between the substrate layer and the adhesive compound or contained in the adhesive compound and capable of absorbing at least one substance capable of permeation, characterized in that the adhesive compound is reversible. In a preferred embodiment, the getter material is selected from the group comprising calcium oxide, calcium sulfate, calcium chloride, pyrogenic silica and zeolites and mixture of two or more of the above substances.

18 Claims, 1 Drawing Sheet

(51) Int. Cl.
    *B32B 43/00*     (2006.01)
    *C08K 3/08*     (2006.01)
    *C08K 3/22*     (2006.01)
    *C08K 3/34*     (2006.01)
    *H01L 51/52*     (2006.01)
    *C09J 7/02*     (2006.01)

(52) U.S. Cl.
    CPC .................. *C08K 3/34* (2013.01); *C09J 7/22* (2018.01); *C09J 7/29* (2018.01); *C09J 7/385* (2018.01); *H01L 51/5246* (2013.01); *H01L 51/5259* (2013.01); *B32B 2305/30* (2013.01); *B32B 2311/00* (2013.01); *B32B 2319/00* (2013.01); *B32B 2405/00* (2013.01); *C08K 3/08* (2013.01); *C08K 2003/2206* (2013.01); *C09J 2203/326* (2013.01); *C09J 2205/102* (2013.01); *C09J 2433/00* (2013.01); *Y10T 428/28* (2015.01); *Y10T 428/2848* (2015.01)

(56) References Cited

U.S. PATENT DOCUMENTS

| | | | |
|---|---|---|---|
| 6,103,141 A | 8/2000 | Incorvia et al. | |
| 6,112,888 A | 9/2000 | Sauro et al. | |
| 6,139,935 A | 10/2000 | Cullen et al. | |
| 6,871,419 B1 * | 3/2005 | Becker | B01J 20/28004 34/416 |
| 6,936,131 B2 | 8/2005 | McCormick et al. | |
| 2001/0004494 A1 | 6/2001 | Mussig | |
| 2003/0119970 A1 * | 6/2003 | Husemann | C08F 293/005 524/505 |
| 2005/0042444 A1 | 2/2005 | Bohm et al. | |
| 2009/0026934 A1 | 1/2009 | Fujita et al. | |
| 2009/0215610 A1 * | 8/2009 | Kullberg | C01B 3/0026 502/56 |
| 2009/0261259 A1 * | 10/2009 | Yip | G01T 1/2018 250/370.09 |
| 2010/0068514 A1 | 3/2010 | Ellinger et al. | |
| 2010/0148127 A1 | 6/2010 | Ellinger et al. | |
| 2011/0036496 A1 | 2/2011 | Keite-Telgenbüscher et al. | |
| 2011/0036623 A1 | 2/2011 | Keite-Telgenbüscher et al. | |
| 2011/0121356 A1 | 5/2011 | Krawinkel et al. | |
| 2011/0237050 A1 * | 9/2011 | Sugimura | H01L 21/6836 438/465 |
| 2013/0183471 A1 * | 7/2013 | Luhmann | C09J 7/0235 428/41.1 |

FOREIGN PATENT DOCUMENTS

| | | |
|---|---|---|
| DE | 102008047964 A1 | 3/2010 |
| DE | 102008062130 A1 | 6/2010 |
| DE | 102008060113 A1 | 7/2010 |
| DE | 102009036968 A1 | 2/2011 |
| DE | 102009036970 A1 | 2/2011 |
| DE | 102010043866 A1 | 5/2012 |
| DE | 102010043871 A1 | 5/2012 |
| EP | 0582968 B1 | 1/1998 |
| EP | 1383182 A2 | 1/2004 |
| EP | 1469054 B1 | 8/2008 |
| EP | 0519278 B2 | 2/2010 |
| EP | 2200105 A2 | 6/2010 |
| JP | 200172946 A | 3/2001 |
| WO | 2005044560 A1 | 5/2005 |
| WO | 2014001005 A1 | 1/2014 |

OTHER PUBLICATIONS

International Search Report for PCT/EP2013/075631 dated Mar. 18, 2014.
Written Opinion of the International Searching Authority for for PCT/EP2013/075631 dated Mar. 18, 2014.
German Search Report for DE Application 10 2012 224 319.4 dated Nov. 22, 2013.

* cited by examiner

METHOD FOR REMOVING PERMEATES FROM FLAT STRUCTURES, AND CORRESPONDING ADHESIVE TAPE

This application is a § 371 U.S. National stage of PCT International Patent Application No. PCT/EP2013/075631, Filed Dec. 5, 2013, which claims foreign priority benefit under 35 U.S.C. § 119 of (1) German Patent Application No. DE 10 2012 224 319.4, filed Dec. 21, 2012 and (2) German Patent Application No. DE 10 2013 202 473.8, filed Feb. 15, 2013, the disclosures of which patent applications are incorporated herein by reference.

The invention concerns the technical field of functionalized adhesive tapes. A method for removing permeates from a flat structure and a correspondingly suitable adhesive tape are proposed.

Optoelectronic devices are now being used in commercial products with increasing frequency or are about to be introduced into the market. Such devices comprise inorganic or organic electronic structures, for example organic, organometallic or polymeric semiconductors, and also combinations thereof. Depending on the desired application, the corresponding products are stiff or flexible, with there being an increasing demand for flexible devices. Such devices are often manufactured by means of printing processes such as relief printing, gravure printing, silkscreen printing, planographic printing, or also so-called "non impact-printing" processes such as e.g. thermal transfer printing, inkjet printing, or digital printing. In many cases, however, vacuum methods such as chemical vapor deposition (CVD), physical vapor deposition (PVD), plasma-enhanced chemical or physical deposition processes (PECVD), sputtering, (plasma) etching, or vapor deposition are also used. Patterning is carried out as a rule by means of masking.

One can cite here, as examples of optoelectronic applications that are already commercially available or show interesting market potential, electrophoretic or electrochrome structures or displays, organic or polymeric light-emitting diodes (OLEDs or PLEDs) used in readout and display devices or as lighting, as well as electroluminescent lamps, light-emitting electrochemical cells (LEECs), organic solar cells such as dye or polymer solar cells, inorganic solar cells, particularly thin-layer solar cells, for example based on silicon, germanium, copper, indium, and selenium, organic field effect transistors, organic switching elements, organic optical amplifiers, organic laser diodes, organic or inorganic sensor, or also organically or inorganically based RFID transponders.

In achieving sufficient useful life and function of optoelectronic devices in the field of inorganic and organic optoelectronics, and especially in organic optoelectronics, protecting the components contained therein from permeates is to be seen as a technical challenge. In this case, permeates are as a rule considered to be gaseous or liquid substances that enter a solid and possibly penetrate or permeate it. Accordingly, numerous low-molecular-weight organic or inorganic compounds may be permeates, with water vapor and oxygen being of particular significance in the context described here.

Numerous optoelectronic devices—particularly when organic materials are used—are sensitive to both water vapor and oxygen. During the useful life of electronic devices, protection by encapsulation is therefore necessary, as performance will otherwise decline over the period of application. For example, if protection is insufficient, oxidation or hydrolysis processes may cause a dramatic decrease over a short period in luminosity in electroluminescent lamps (EL lamps) or organic light-emitting diodes (OLED), contrast in electrophoretic displays (EP displays), or efficiency in solar cells.

In addition to protection from penetrating permeates, however, the removal of harmful permeates from many materials used in the structure of the electronic device itself is also absolutely necessary. In particular, the polymeric substrate, covering, or adhesive films often used in flexible structures often themselves contain harmful permeates, particularly water, with the result that these materials must be dried by costly methods.

Moreover, particularly in the continuous production of flat electronic devices, materials are used that function only as auxiliary materials, such as temporary substrate materials, for example, on which e.g. discrete units are placed and transported in successive processing stages.

Auxiliary materials, only parts of which remain in the electronic structure, are also used, and are accordingly to be provided in permeate-free form.

In particular, a substrate film such as that used in "Laser-Induced Thermal Imaging" (LITI) for the preparation and transfer of the organic light-emitting layer is to be provided in permeate-free form, as it comes into direct contact with the sensitive material.

Furthermore, intermediate stages in the production of flat electronic structures are sometimes coated or printed with materials that are present in an aqueous dispersion. For example, e.g. electron or hole transport layers are manufactured from intrinsically conductive polymers such as Clevios (PEDOT:PSS; Heraeus Precious Metals). Water must be removed to a high degree from such layers by means of costly processes, as they come into direct contact with the sensitive materials.

However, methods for drying or keeping dry flat structures are also used in other fields of application, e.g. in the pharmaceutical industry in the production and storage of medicated patches or medical diagnostic strips, in chemical analysis in the extraction of substances to be analyzed, or quite commonly for covering sensors.

Medicated patches or transdermal therapeutic systems (TTS, TDS) were introduced on the market 1979 and are widely used today with a series of active ingredients. By means of these systems, which are comparable with conventional patches, active ingredients (e.g. hormones, nicotine, etc.) are transdermally administered through the skin. The advantage of this administration form is that the active ingredient is transferred directly into the bloodstream, bypassing the gastrointestinal tract. This spares the gastrointestinal system and reduces metabolism of the active ingredient by the hepatic system before the it reaches the site of action. Moreover, acceptance by the patient (compliance) is improved because the systems are applied not daily, but only at long intervals. The situation is similar with orally-administered soluble films (oral dissolvable films, ODF).

The advantages of TTS and ODF could be manifested even more clearly if the release of the active ingredient from such systems took place interactively and in a controlled manner. This includes e.g. the release or mobilization of active ingredients by means of permeates, including e.g. water vapor or oxygen, which cannot penetrate into the system until after application. Accordingly, there is a need to remove the permeate from such medicated patches after production and to keep them permeate-free, and to make them available to patients.

Methods for absorbing permeates from specified materials using adhesives are generally known in the prior art.

For example, U.S. Pat. No. 6,103,141 describes hot melt adhesive filled with a desiccant that is provided in the form of an adhesive tape. This tape is attached to the inner side of a container in order to keep the container space dry. In a preferred embodiment, the hot melt adhesive filled with the desiccant is coated onto one side of a substrate material, and the other side of the substrate material is coated with an adhesive filled with a dessicant, which then in application bonds to the container wall.

U.S. Pat. No. 6,139,935 describes an oxygen-absorbing label that is glued onto the inner side of a container and keeps the container space free of oxygen.

DE 19913761 A1 describes a flat and activatable drying device for reducing the moisture content of a gas space surrounding the device and a production method for such a device. In this case, the desiccant may also be incorporated into a pressure-sensitive adhesive layer.

The subject matter of EP 0582968 B1 is a film composite with a water vapor barrier that is composed of a plastic film, an adhesive layer formed by a solvent-containing or solvent-free adhesive or a hot melt adhesive, which contains 10 to 50 wt. % of a finely-dispersed water-absorbing polymer powder (SAP), as well as a second plastic film attached to the first plastic film via this adhesive layer. This type of film composite is used for packaging moisture-sensitive products. The water-absorbing adhesive layer filled with a desiccant retards the penetration of water through the film composite. Penetration of water into the package is thus substantially reduced.

JP 2001072946 A describes an adhesive tape with a substrate and a pressure-sensitive adhesive layer, wherein the pressure-sensitive adhesive layer contains a hygroscopic powder and a moisture-absorbing substance. The hygroscopic powder consists in this case of hydroxy acid or salts thereof, which act as setting retarders for mortar or concrete. The desiccant is intended to improve the dispersability of this retarder in the adhesive compound, i.e. to keep the retarder dry. Mortar or concrete that runs into the gap between tiles and the adhesive tape because of the uneven surface of the tiles is prevented from setting by the retarder contained in the adhesive compound, so that it can easily be wiped off the tile composite after removal of the adhesive tape.

U.S. Pat. No. 6,112,888 discloses a hot melt adhesive composition of a polymer and a desiccant that is used for maintaining or creating a dry packing atmosphere. The composition is applied to the inside of a package from the melt, e.g. by extrusion or spraying, but can also be directly applied to the filling material.

U.S. Pat. No. 6,936,131 describes an encapsulation method for organic electronic structures in which a transfer adhesive tape containing a desiccant is used to prevent bonding of the substrate and covering. The desiccant retards the permeation of water vapor through the adhesive joints into the electronic structure.

The use of adhesive tapes for the drying of gas spaces or as a permeation barrier in adhesive joints is therefore known in the art. In addition, however, there is also a need for a method of drying flat structures.

Flat structures, particularly those manufactured or produced in a continuous process in the shape of a strip, are difficult to manufacture in a permeate-free, and particularly a dry manner, and it is difficult to remove permeate from them because of their often large dimensions and the fact that they are often present in wound form on a roll. Because of their high surface/volume ratio, they also readily absorb permeate from the environment, i.e., the permeate must again be removed before they are placed in a permeate-free environment or come into contact with permeate-sensitive material.

The object of the invention is therefore to provide an easy-to-carry-out and effective method and a suitable device for absorbing permeates from flat structures.

The realization of this object is based on the idea of using a correspondingly configured adhesive tape.

A first object of the invention is therefore a method for removing permeates from a flat structure, which comprises the gluing of an adhesive tape containing at least one getter material to the flat structure, storage of the composite of the adhesive tape and the flat structure so obtained, and removal of at least a part of the adhesive tape containing the getter material from the flat structure, wherein the adhesive tape can at least partially absorb at least one permeate from the flat structure.

In a preferred embodiment, the method according to the invention includes removing the adhesive tape from the flat structure, which is to be understood as removing—essentially—all of the adhesive tape from the flat structure.

A "flat structure" is understood to refer to a flat arrangement of a system whose dimensions are significantly smaller in one spatial direction (thickness or height) than in the other two spatial directions that define maximum extension (length and width). According to the invention, this type of flat structure may be configured either in a compact or pierced manner and consist of a single material or various materials. A flat structure may show constant thickness over its entire surface area or also have differing thicknesses. In addition, it may consist of one or several layers, which may be arranged in a congruent or at least partially non-overlapping manner.

The flat structure is e.g. a film, particularly a substrate, covering, and/or adhesive film and/or a substrate film, a layer, which can be arranged on a substrate film and/or part of a layered composite, and/or a medicated patch.

An adhesive tape is understood to refer to at least one pressure-sensitive adhesive, at least one activatable adhesive coated substrate material, pressure-sensitive adhesive in the form of a flat structure, or an activatable adhesive in permanent form. An adhesive tape is generally deemed to be a flat structure due to its shape. Tapes with extended length and limited width, tape sections, labels, blanks and the like are also included in the designation "adhesive tape." Not included, on the other hand, are cured and uncured liquid adhesives or bonded materials manufactured therewith.

Preferably, the adhesive compound placed on the flat structure of the adhesive tape used in the method according to the invention is a pressure-sensitive adhesive compound or an activatable adhesive compound. More preferably, the adhesive compound placed on the flat structure of the adhesive tape used in the method according to the invention is an activatable pressure-sensitive adhesive compound. Pressure-sensitive adhesive compounds are adhesive compounds whose cured film remains permanently sticky and capable of adhesion at room temperature and when dry. Pressure-sensitive adhesive compounds allow lasting bonding to the adhesive base with application of relatively little pressure.

A distinction is generally made between pressure-sensitive adhesive compounds for permanent applications and those for reversible applications (reversibly configured pressure-sensitive adhesive compounds). While the former as a rule can only be detached with great expenditure of effort, often causing destruction of the base layer or the adhesive tape itself, the latter can be detached with relatively little expenditure of effort and without destroying the adhesive base, usually leaving no residue whatsoever.

According to the invention, the adhesive compound placed on the flat structure of the adhesive tape used in the method according to the invention should preferably be reversibly configured.

The reversibility of a pressure-sensitive adhesive compound can be described by means of its properties.

In terms of its viscoelastic properties, a substance is generally deemed to be suitable for pressure-sensitive adhesive applications if, at room temperature in the frequency range of $10^0$ to $10^1$ rad/s, and ideally in the frequency range of $10^{-1}$ to $10^2$ rad/s, the storage modulus G' is in the range of $10^3$ to $10^6$ Pa and the loss modulus G" is also in this range. Within this range, which can also be referred to in a matrix application of G' and G" (G' plotted against G") as the viscoelastic window for pressure-sensitive adhesive applications or as the pressure-sensitive adhesive window according to viscoelastic criteria, there are in turn various sectors or quadrants, which further characterize the pressure-sensitive adhesive properties to be expected of the respective substances. According to Chang (J. Adhesion, 1991, vol. 34, pp. 189-200), reversible pressure-sensitive adhesive compounds are characterized by G' in the range of $10^3$–$3\times10^4$ Pa and G" in the range of $10^3$–$3\times10^4$ Pa, at room temperature and a measurement frequency of $10^{-2}$ rad/s respectively.

The storage modulus and loss modulus of pressure-sensitive adhesive compounds are determined here in an oscillation shear test (dynamic mechanical analysis, DMA) under torsional loading at a temperature of 23° C. and a frequency of 0.01 rad/s. The test is used for investigating rheological properties and is described in detail in Pahl et al. "Practical Theology of Plastics and Elastomers," VDI Publishing House, 1995, pp. 57 to 60 and 119 to 127). The test is run in a controlled shear rate rheometer under torsional loading, with parallel plate geometry with a plate diameter of 25 mm being used.

Generally, according to the invention, an adhesive compound is preferably considered to be reversibly configured if it shows an adhesion to steel of <3 N/cm, and more preferably <2.2 N/cm.

According to the invention, all pressure-sensitive adhesive compounds known to the person having ordinary skill in the art may be used in the method according to the invention, e.g. including those based on acrylates and/or methacrylates, polyurethanes, natural rubbers, synthetic rubbers; styrene block copolymer compounds with an elastomer block of unsaturated or hydrated polydiene blocks such as e.g. polybutadiene, polyisoprene, copolymers of the two, polybutylene, particularly polyisobutylene, as well as other elastomer blocks known to the person having ordinary skill in the art; polyolefins, particularly poly-α-olefins and/or polyisobutylene; fluoropolymers and/or silicone. The term "pressure-sensitive adhesive compound" also includes other compounds having pressure-sensitive adhesive properties according to the "Handbook of Pressure-Sensitive Adhesive Technology" by Donatas Satas (Satas & Associates, Warwick 1999).

When pressure-sensitive adhesive compounds based on acrylate are mentioned in this text, it is to be understood, even when not explicitly stated, that these also include pressure-sensitive adhesive compounds based on methacrylates and based on acrylates and methacrylates, unless expressly described otherwise.

Adhesive compound systems in which generation of adhesion per se, increasing or decreasing of adhesion by energy input, for example by actinic irradiation or heat, or material interaction take place are to be considered activatable adhesive compounds. The activation is preferably used to induce reversibility of the adhesion, particularly in cases where a pressure-sensitive adhesive compound is not to be classified according to Chang as a reversible pressure-sensitive adhesive compound before its activation. Such pressure-sensitive adhesive compounds are known for example from the area of grinding and dicing adhesive tapes, which are used in wafer processing.

Generally, all common activated bonding adhesive compound systems may be used as activatable adhesive compounds. According to the invention, activation should preferably take place, as a rule, by energy input, for example and particularly preferably by actinic radiation or heating (heat-activated bonding adhesive compounds).

According to the invention, so-called "autoadhesive" layers are considered to be reversibly configured pressure-sensitive adhesive compounds. Autoadhesive layers are used e.g. in protective films for displays. They show no or very little tack, but adhere in particular to extremely smooth surfaces. Autoadhesive layers are described for example in WO 2005/044560 A1 or DE 19742805 A1.

The adhesive tape used in the method according to the invention contains at least one getter material. Here, "getter material" is understood to refer to a material that is capable of taking up (sorption) of one or more substance(s) capable of permeation. Taking up of the substance(s) capable of permeation by the getter material may take place e.g. by absorption or adsorption, wherein adsorption may occur both as chemisorption and physisorption. The getter material could therefore also be referred to as a "sorbent" or "sorption agent."

A "substance capable of permeation" is understood to refer to a substance that can penetrate into the flat structure as a gas or liquid, and if applicable also as a solid, and then permeate it. Such substances were also referred to above and will be referred to below as "permeates." Permeates can originate from the flat structure itself or from the environment. The flat structure itself often contains low-molecular-weight organic compounds such as solvent residues, residual monomers, oils, resin components, softeners, and water. Those originating from the environment frequently include water, volatile organic compounds (VOCs), low-molecular-weight hydrocarbons, and oxygen. The following substances in particular are considered to be "substances capable of permeation" or "permeates:"

Acetonitrile, 1-butanol, chlorobenzene, chloroform (trichloromethane), cyclohexane, diethylether, 1,4-dioxane, glacial acetic acid (acetic acid), acetic anhydride, acetic acid ethylester (ethyl acetate, acetic ester), acetic acid-n-butylester (n-butyl acetate), acetic acid tert-butylester (t-butyl acetate), ethanol, methanol, n-hexane, n-heptane, 3-hexanone, 2-propanol (isopropanol), 3-methyl-1-butanol (isoamyl alcohol), methylene chloride (dichloromethane), methyl ethyl ketone (butanone), methyl isobutyl ketone, nitromethane (nitrocarbol), n-pentane, 2-pentanone, 3-pentanone, petroleum ether (light gasoline), benzene, propanol, pyridine (azine), tert-butylmethylether, tetrachloroethene (perchloroethene), tetrahydrofuran, toluene, trichloroethane, triethylamine, xylene, oxygen, methane, ethane, propane, propene, butane, butene, carbon dioxide, ozone, sulfur dioxide, water.

Preferably, in the method according to the invention, the adhesive tape is at least capable of at least partially absorbing water from the flat structure.

Examples of suitable getter materials include: salts such as cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium dithionite, sodium carbonate, sodium sulfate, potassium disulfite, potassium carbonate, magnesium carbonate; layered silicates such as montmorillonite and bentonite; metal oxides such as barium oxide, calcium oxide, iron oxide, magnesium oxide, sodium oxide, potassium oxide, strontium oxide, aluminum oxide (activated alumina) and titanium dioxide; further, carbon nanotubes, activated carbon, phosphorus pentoxide and silanes; readily oxidizable metals such as iron, calcium, sodium, and magnesium; metal hydrides such as calcium hydride, barium hydride, strontium hydride, sodium hydride, and lithium aluminum hydride; hydroxides such as potassium hydroxide and sodium hydroxide; metal complexes such as e.g. aluminum acetyl acetonate; moreover, silicic acids such as e.g. silica gel; diatomaceous earth; zeolites; furthermore, organic absorbers such as polyolefin copolymers, polyamide copolymers, PET copolyester, anhydrides of mono- and polycarboxylic acids such as acetic anhydride, propionic anhydride, butyric anhydride or methyltetrahydrophthalic anhydride or other hybrid polymer-based absorbers, which are usually used in combination with catalysts such as cobalt; carbodiimides; other organic absorbers such as e.g. weakly crosslinked polyacrylic acid, polyvinyl alcohol, ascorbate, glucose, gallic acid, or unsaturated fats and oils. With respect to binding of oxygen in particular, organometallic oxidation additives based on chelating amines and transition metal complexes are also advantageously used, particularly in combination with oxidizable substrate materials. According to the invention, mixtures of two or more getter materials may also be used.

In accordance with their function, the getter materials are preferably used as essentially permeate-free materials, for example water-free materials. This distinguishes getter materials from similar materials used as fillers. For example, silica is frequently used as a filler in the form of pyrogenic silicic acid. However, if this filler is stored under environmental conditions, which is the common practice, it absorbs water from the environment and is no longer functional to a technically usable extent as a getter material. Only dry silica or silica kept dry can be used as a getter material. However, it is also possible according to the invention to use materials that are already complexed with permeates, e.g. $CaSO_4*\frac{1}{2}H_2O$ (calcium sulfate-hemihydrate) or partially hydrated silicic acids, which by definition are present as compounds of the general formula $(SiO_2)m*nH_2O$.

The term "silanes" is understood to refer to compounds of the general formula $R_a$—Si—$X_{4-a}$ or their partial condensation products. In the formula, a denotes a whole number from 0 to 3, preferably 0 or 1. X designates a hydrolyzable group, e.g. preferably a halogen atom, particularly chlorine, an alkoxy group such as a methoxy, ethoxy, n-propoxy, iso-propoxy, n-butoxy, sec-butoxy, or tert-butoxy group, or an acetoxy group. Other examples of hydrolyzable groups known to the person having ordinary skill in the art can also be used in the scope of the present invention. If several substituents X are present, these may be the same or different. R denotes an optionally substituted hydrocarbon residue, e.g. a methyl, ethyl, n-propyl, iso-propyl, n-butyl, sec-butyl, tert-butyl group, of pentyl group as well as branched isomers thereof, a hexyl group and branched isomers thereof, a heptyl group and branched isomers thereof, an ioctyl group and branched isomers thereof, a nonyl group and branched isomers thereof, a decyl group and branched isomers thereof, an undecyl group and branched isomers thereof, a dodecyl group and branched isomers thereof, a tetradecyl group and branched isomers thereof, a hexadecyl group and branched isomers thereof, an octadecyl group and branched isomers thereof, or an eicosyl group and branched isomers thereof. The hydrocarbon residues may also contain ring-shaped and/or aromatic components. Representative structures include cyclohexyl, phenyl, and benzyl groups. The hydrocarbon residue(s) R optionally contain(s) e.g. one or more heteroatom-containing substituents such as amino groups, aminoalkyl groups, glycidyloxy groups, (meth)acryloxy groups and the like. If several substituents R are present, these may be the same or different.

A silane suitable for use as a getter material is preferably selected from the group comprising N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-aminopropyldiethoxymethylsilane, N-(2-aminoethyl)-3-aminopropyldimethoxymethylsilane, (N-butyl)-3-aminopropyltrimethoxysilane, 3-(N-ethylamino)-2-methylpropyltrimethoxysilane, 4-amino-3,3-dimethylbutyltrimethoxysilane, 4-amino-3,3-dimethylbutyldimethoxymethylsilane, (N-cyclohexyl)-aminonnethyldimethoxynnethylsilane, (N-cyclohexyl)-aminomethyltrimethoxysilane, (N-phenyl)-3-aminopropyltrimethoxysilane, (N-phenyl)-aminomethyldimethoxymethylsilane, (N-benzyl-2-aminoethyl)-3-aminopropyltrimethoxysilane, [2-(N-benzyl-N-vinylamino)-ethyl]-3-aminopropyltrimethoxysilane hydrogen chloride, [2-(N-benzyl-N-vinylamino)-ethyl]-3-aminopropyltrimethoxysilane, bis-(3-propyltriethoxysilyl)-amine, vinyltrimethoxysilane, vinyltriethoxysilane, vinyl-tri (2-methoxyethoxy)-silane, vinyltriisopropoxysilane, vinyldimethoxymethylsilane, vinyltriacetoxysilane, 3-triethoxysilylpropylsuccinic anhydride, 3-glycidyloxypropyltrimethoxysilane, 3-glycidyloxypropyltriethoxysilane, 2-(3,4-epoxycyclohexyl)-ethyltriethoxysilane, 3-glycidyloxypropyldiethoxymethylsilane, 3-methacryloyloxypropyltrimethoxysilane, 3-methacryloyloxypropyltriethoxysilane, 3-methacryloyloxypropyltriisopropoxysilane, 3-methacryloyloxypropyldimethoxymethylsilane, 3-methacryloyloxypropyldiethoxymethylsilane, 3-chloropropyltrimethoxysilane, 3-chloropropyltriethoxysilane, 3-isocyanatopropyltrimethoxysilane, 3-isocyanatopropyltriethoxysilane, isocyanatomethyltrimethoxysilane, isocyanatomethyldimethoxymethylsilane, tris-[3-(trimethoxysilyl)-propyl]-isocyanurate, 3-ureidopropyltrimethoxysilane, 3-ureidopropyltriethoxysilane, 2-hydroxy-4-(3-triethoxysilylpropoxy)-benzophenone, 4-(3'-chlorodimethylsilylpropoxy)-benzophenone, 3-mercaptopropyltrimethoxysilane, 3-mercaptopropyldimethoxymethylsilane, bis-(3-triethoxysilylpropyl)-disulfane, bis-(3-triethoxysilylpropyl)-tetrasulfane, (triethoxysilylpropyl)-polysulfane, and ioctadecylaminodimethyltrimethoxysilylpropylammonium chloride.

Preferably, the getter material is selected from the group comprising cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, and magnesium carbonate, as well as diatomaceous earth, silicic acids (silica), zeolites, layered silicates and iron, calcium, sodium, magnesium, barium oxide, calcium oxide, iron oxide, magnesium oxide, sodium oxide, titanium dioxide, potassium oxide, strontium oxide, and activated aluminum oxide, as well as carbon nanotubes, activated carbon, phosphorus pentoxide, silane and calcium hydride, barium hydride, strontium hydride, sodium hydride and lithium aluminum hydride, potassium hydroxide, sodium hydroxide, and aluminum acetylacetonate, as well as polyolefin copolymers, polyamide copolymers, PET copolyester, acetic anhydride, propionic anhydride, butyric anhydride, methyltetrahydrophthalic anhydride, polyacrylic acid, and polyvinyl alcohol, as these materials are particularly suitable as water getters.

In terms of a particularly pronounced binding action on oxygen, the getter material is preferably selected from the group comprising iron, sodium dithionite, barium oxide, iron(II,III)-oxide, carbohydrazide, activated aluminum oxide, zeolites, activated carbon, sulfite, ascorbate, hydrazine, morpholine, 2-butanone oxime, diethylhydroxylamine, glucose, gallic acid, unsaturated fats and oils, and organometallic oxidation additives based on chelating amines and transition metal complexes, particularly in combination with oxidizable substrate materials.

It is particularly preferable to select the getter material from the group comprising cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, zeolites, calcium, magnesium, barium oxide, calcium oxide, magnesium oxide, sodium oxide, potassium oxide, strontium oxide, activated carbon, phosphorus pentoxide, silanes, calcium hydride, barium hydride, strontium hydride, sodium hydride and lithium aluminum hydride, potassium hydroxide, sodium hydroxide, acetic anhydride, propionic anhydride, butyric anhydride, methyltetrahydrophthalic anhydride, and carbodiimides, as well as mixtures of two or more of the above substances. These materials show a high absorption capacity with respect to at least one of the abovementioned permeates, and particularly with respect to water as well.

"Carbodiimides" is understood to refer to compounds of the general formula $R^1$—N═C═N—$R^2$, wherein $R^1$ and $R^2$ are organic residues, particularly alkyl or aryl residues, which may be the same or different.

Most preferably, the getter material is selected from the group comprising barium, calcium, calcium sulfate, calcium chloride, calcium oxide, sodium sulfate, potassium carbonate, copper sulfate, magnesium perchlorate, magnesium sulfate, lithium chloride, silicic acids and zeolites, as well as mixtures of two or more of the above substances. These getter materials offer the advantages of being easy to incorporate into the relevant layer of the adhesive tape, showing a high absorption capacity, and being regenerable getter materials. These are understood to refer to substances that under certain conditions are capable of re-releasing the absorbed permeates, e.g. water, thus becoming capable of renewed permeate absorption. This makes possible a method in which any permeates that may have been absorbed by the getter-containing adhesive tape can largely be removed therefrom before it is brought into contact with the flat structure, e.g. by drying. In this manner, the full getter capacity in use of the adhesive tape is advantageously made available.

Preferably, the getter material is selected from the group comprising calcium oxide, calcium sulfate, calcium chloride, pyrogenic silicic acids and zeolites, as well as mixtures of two or more of the above substances. These materials show a particularly high capacity to absorb water and other permeates, are largely regenerable, can be outstandingly incorporated into the adhesive tape, and negatively affect the function of the individual layers not at all or only to a negligible extent.

In a preferred embodiment of the invention, the getter material is selected from calcium oxide, calcium, iron, barium, lithium chloride and cobalt chloride. Due to changes in their optical properties, these substances allow conclusions to be drawn as to the permeate content of the flat structure. Therefore, as long as free getter capacity is still recognizable based on the optical appearance of the adhesive tape, this can be taken as an indicator that no more, or at the very least only small quantities, of permeates are diffused in the flat structure. Metallic calcium, for example, loses its metallic-opaque appearance and becomes increasingly transparent; cobalt chloride changes its color on absorption of water from blue to pink. Preferably, the getter material is calcium oxide.

Advantageously, the amount of the getter material in the layer of the adhesive tape containing the getter material should be at least 1 wt. %, and preferably at least 10 wt. %, relative in all cases to the weight of the layer in question. The maximum amount of the getter material in the various layers of the adhesive tape containing the getter material is not limited in any case and can extend to a single layer of pure getter material.

The content essentially depends on the desired absorption capacity of the respective permeate(s).

For example, if only low absorption capacity is required, the use of a small amount of a getter material having a lower absorption capacity may be sufficient. In a preferred embodiment, the layer containing the getter material or the layers containing the getter material therefore contain 1 to 5 wt. % of getter material respectively. If this layer is the adhesive compound of the adhesive tape, this is also advantageous, because the low amount of the getter material does not have any substantial negative effect on adhesive properties.

If an extremely high absorption capacity of the adhesive tape is required, however, a relatively higher amount of getter material must be used in the layer containing the getter material, in which case the getter material should also have high absorption capacity. However, a getter material with a low absorption capacity may also be used if this is advisable due to considerations of cost or tolerability. Another preferred embodiment of the flat structure according to the invention therefore contains 20 to 99 wt. % relative to the total weight.

If the layer containing the getter material is an adhesive compound, a content of 10 to 80 wt. % is preferred so that sufficient adhesive properties are retained. However, if the reversibility of the adhesive compound is to be increased or first established, a content of 50-95 wt. % is advantageous, relatively to the total weight of the adhesive compound containing the getter material respectively.

Preferably, the adhesive tape has a permeate content of less than 1000 ppm, and particularly preferably, less than 100 ppm. Here, the unit ppm refers to the ratio of the total weight of the permeate contained to the weight of the adhesive tape. The permeate content can be determined by gas chromatography according to VDA 277, or in the case of water, according to DIN EN ISO 62 (Gravimetric processes, Method 4) or DIN 53715 (Karl Fischer titration) after storage of the test piece for 24 hours at 23° C. and 50% relative humidity. With low permeate content, the capacity of the getter material of the adhesive tape is not affected to a great extent by permeate diffusing from the adhesive tape itself, and the adhesive tape better fulfills its function as a protective or drying device.

Advantageously, at least one layer of the adhesive tape, more preferably at least one of the outer layers of the adhesive tape, and most preferably the adhesive compound layer intended for application to the flat structure, shows a low permeation rate with respect to the permeate to be immobilized. In the case of water vapor as the permeate, the water vapor transmission rate (WVTR) should preferably be less than 50 g/(m$^{2*}$d), and particularly preferably less than 20 g/(m$^{2*}$d) with respect to a layer thickness of 50 μm. In this case, WVTR is measured at 38° C. and 90% relative humidity according to ASTM F-1249, and oxygen transmission rate (OTR) is measured at 23° C. and 50% relative humidity according to DIN 53380, Section 3.

Because of the low permeation rate, especially in production of the adhesive tape, less permeate diffuses from the environment through the respective layer(s) into the getter-material-containing layer of the adhesive tape, which can therefore perform its function longer despite low getter content or be equipped with an even smaller amount of getter material, which reduces costs. Particularly preferably, therefore, at least the two outer layers of the adhesive tape show a low permeation rate for the permeate to be immobilized.

As examples of (pressure-sensitive) adhesive compounds with an inherent barrier action, particularly such (pressure-sensitive) adhesive compounds that have a thickness of 50 μm with a water vapor transmission rate of less than 50 g/(m$^{2*}$d) and/or an oxygen transmission rate of less than 5000 g/(m$^{2*}$d*bar), examples of suitable compounds—with this by no means limiting the scope of the invention thereto—are compounds such as those disclosed in the documents DE 102010043871 (A1), DE 102010043866 (A1), DE 102008060113 A1, DE 200810062130 A1, DE 200810047964 A1, DE 200910036970 A1, DE 200910036968 A1, US 20090026934 (A1), EP 1 469 054 B1 and EP 0519278 B2.

Preferably, adhesive compounds based on synthetic rubbers are used because as a rule, they have relatively low water vapor transmission rates, particularly those based on polyisobutylene and copolymers thereof, polybutene, butyl rubber, styrene block copolymers with polymer blocks formed by polymerization of 1,3-diene, particularly butadiene, isobutylene, and/or isoprene, which can also contain specifically or completely hydrated polymer blocks, and polyolefins and copolymers thereof (also see DE 19742805 A1).

Preferably, the adhesive compound placed on the flat structure of the adhesive tape is free of adhesive resins. As a rule, this further improves the reversibility of adhesion.

In an embodiment of the invention, the adhesive tape has a substrate material, as this advantageously improves punchability and/or applicability.

Textile flat structures, papers, plastic-coated papers, or films may be used as substrate materials, with films, particularly dimensionally stable plastic or metal films. The substrate layer or the substrate material therefore preferably consists of polyesters, and particularly preferably polyethylene terephthalate, for example biaxially stretched polyethylene terephthalate; or polyolefins, particularly polybutene, cycloolefin copolymer, polymethylpentene, polypropylene or polyethylene, for example monoaxially stretched polypropylene, biaxially stretched polypropylene, or biaxially stretched polyethylene. Polyester films show the advantage of providing temperature stability and adding increased mechanical stability. Most preferably, therefore, the substrate layer or substrate material in the adhesive tape used in the method according to the invention consists of a polyester film, e.g. biaxially stretched polyethylene terephthalate.

In a preferred embodiment, the substrate material also has a barrier function against one or more specific permeate(s), particularly against water vapor and oxygen, so that the getter material contained in the adhesive tape is not partially or even completely saturated during the production and/or storage of the adhesive tape by permeate diffusing from the environment. A barrier function of this type may be provided by organic or inorganic materials. Moreover, such a substrate material in the adhesive tape prevents permeate from the environment from diffusing into the flat structure from which permeate is to be removed.

Particularly preferably, the substrate material contains at least one inorganic barrier layer. Particularly suitable as inorganic barrier layers are metals deposited in a vacuum (for example by means of vapor deposition, CVD, PVD, PECVD) or under atmospheric pressure (for example by means of atmospheric plasma, reactive corona discharge, or flame pyrolysis), such as aluminum, silver, gold, nickel, or in particular metal compounds such as metal oxides, nitrides or hydronitrides, e.g. oxides or nitrides of silicon, boron, aluminum, zirconium, hafnium, or tellurium, as well as indium tin oxide (ITO). Layers of the above-mentioned embodiments doped with other elements are also suitable.

High power impulse magnetron sputtering and atomic layer deposition, which make it possible to achieve highly impermeable layers at low temperatures of the substrate layer, are to be mentioned as particularly suitable methods for applying an inorganic barrier layer. Preferably, a permeation barrier of the substrate layer with a barrier function or the composite of a substrate layer and a barrier should have transmission rates against water vapor (WVTR) of <1 g/(m$^{2*}$d) and/or against oxygen (OTR) of <1 cm$^3$/(m$^{2*}$d*bar) respectively in relation to the thickness of the substrate layer used in the flat structure, i.e. not standardized with respect to a specific thickness. In this case, WVTR is measured at 38° C. and 90% relative humidity according to ASTM F-1249 and OTR is measured at 23° C. and 50% relative humidity according to DIN 53380 Part 3.

The method according to the invention is characterized by removing at least a part of the adhesive tape containing the getter material from the flat structure. The getter material may be contained in the adhesive compound, in the substrate layer, or in another layer of the adhesive tape or be continued as a separate layer. Getter material may also be contained in several parts of the adhesive tape. In this case, the same or different getter materials may be used. It is therefore also considered to be in accordance with the invention if the removal of at least a part of the adhesive tape containing the getter material does not include all parts of the adhesive tape that contain getter material, and therefore the part of the adhesive tape remaining on the flat structure still contains getter material. In all cases, a part of the getter material contained in the adhesive tape is removed.

In an advantageous embodiment of the method, a part of the adhesive tape remains on the flat structure. It is therefore advantageous to configure the adhesive tape as an adhesive tape that is separable when pulled off, with separable being understood to mean that the adhesive tape can be detached within its layer structure (adhesive separation) or within one layer (cohesive separation), with the force required for detachment being less than the adhesive force of the compound to the flat structure.

It is particularly advantageous if the remaining part of the adhesive tape after removal of the getter-material-containing part of the adhesive tape shows an adhesive surface. This is the case, for example, if only the adhesive compound layer remains on the flat structure. This type of remaining adhesive surface can be used advantageously to bond the permeate-free flat structure to a substrate. This occurs e.g. when a release liner containing a getter material is pulled off the adhesive tape as described below.

The adhesive tape can be covered with a liner. Adhesive tapes that are coated with adhesives on one or both sides are usually wound onto a roll in the form of an Archimedean spiral at the end of the production process. In order to prevent the adhesive compounds in double-sided adhesive tapes from coming into contact with each other, or in order to prevent the adhesive compound from bonding to the substrate in one-sided adhesive tapes, the adhesive tapes are covered before winding with a covering material (also referred to as a separating material) that is wound up together with the adhesive tape. Such covering materials are known to the person having ordinary skill in the art under the names liners or release liners. In addition to covering adhesive tapes that bond on one or two sides, liners are also used for covering pure adhesive compounds (transfer adhesive tape) and adhesive tape sections (e.g. labels).

Accordingly, a liner is understood to refer to a covering material having an anti-adhesive (abhesive) surface that is directly applied to an adhesive compound for the temporary protection of the compound, and as a rule can be removed by simply pulling it off immediately prior to application of the adhesive compound. It is particularly advantageous if an adhesive tape used in the method according to the invention or an adhesive tape according to the invention is covered with a release liner that can be pulled off before carrying out the method. Particularly preferably, the release liner should have the same permeation barrier properties as those mentioned above for the substrate material, so that the getter material contained in the adhesive tape is not partially or even completely saturated during the production and/or storage of the adhesive tape by permeate diffusing from the environment.

The release liner may also contain getter material. In this case, the release liner is considered to be a constituent part of the adhesive tape, as it performs a function in use of the adhesive tape in the method according to the invention. The removal of the release liner would therefore constitute removal of a part of the adhesive tape containing getter material.

The thickness of the adhesive tape used in the method according to the invention may include all common thicknesses, e.g. from 1 µm up to 3000 µm. The thickness is preferably between 25 and 100 µm, as adhesion and handling properties are particularly positive in this range. An even more preferable range is a thickness of 3 to 25 µm, as in this range the total thickness of the flat structure to be dried/protected and the adhesive tape is not greatly increased, and this has only a minimal negative effect on the flexibility of the overall structure.

In producing an adhesive tape used in the method according to the invention or an adhesive tape according to the invention, the substrate of the adhesive tape or a liner is preferably coated or printed on one side with a preferably getter-material-containing adhesive compound from solution or dispersion or 100% (for example a melt), or the adhesive tape is produced by (co)extrusion. Alternatively, production by transferring a preferably getter-material-containing adhesive compound layer by lamination onto a substrate material or a liner is possible. The adhesive compound layer can be crosslinked by heating or high-energy radiation. In such processes, structures are also advantageously produced in which the getter material is present in a layer different from that containing the adhesive compound.

Generally, the layer containing the getter material can be directly applied from the solution, emulsion, or dispersion by a method known to the person having ordinary skill in the art. In this case, the solvent, emulsifier, or dispersing agent used can then be evaporated in an ordinary commercial drier. A solvent-free coating, produced e.g. by scattering, flocking, or powdering processes, is also suitable.

According to the invention, the layer containing the getter material may also be printed. For this purpose, the gravure and silkscreen printing processes of the prior art are suitable. Preferably, rotary printing processes are used in this case. Moreover, coatings may also be applied by spraying. This may take place by rotary spraying processes, or if applicable electrostatically.

This manufacturing process preferably takes place in an environment in which the specific permeate is contained in a low concentration or is virtually absent. As an example, one can mention relative humidity of less than 30%, and preferably less than 15%.

In order to optimize properties, the adhesive compound to be used may be mixed with one or more additives such as tackifiers (resins), softeners, fillers, pigments, UV absorbers, light stabilizers, antioxidants, crosslinking agents, crosslinking promoters, and/or elastomers.

The amount of the adhesive layer in the adhesive tape should preferably be 1 to 200 g/m$^2$, and more preferably 10 to 100 g/m$^2$, with "amount" being understood to refer to the removal of water or a solvent that may be carried out.

The method according to the invention is preferably used in removing permeates from feedstocks or intermediate products in the manufacture of organic electronic structures, particularly e.g. from substrate or covering materials, in particular from printed anodes or cathodes, and even more particularly printed conductive layers or conductive paths, hole injection layers (HIL), particularly those based on aqueous dispersions of intrinsically conductive polymers such as e.g. PEDOT:PSS, and from specially printed organic light-emitting or absorbing layers, particularly LITI films, and from medicated patches.

In a particularly preferred embodiment, the method according to the invention is used for removing permeates from substrate or covering films, from hole injection layers, and from organic light-emitting or absorbing layers.

A further object of the invention is an adhesive tape that comprises a substrate layer with a water vapor transmission rate of <1 g/(m$^{2*}$d) (measured according to ASTM F-1249 at 38° C. and 90% relative humidity), an adhesive compound, and at least one getter material arranged in a layer between the substrate layer and the adhesive compound or contained in the adhesive compound and capable of absorbing at least one substance capable of permeation, and is characterized in that the adhesive compound is reversibly configured. This type of adhesive tape makes it possible to remove permeate from a flat structure in a highly efficient manner and simultaneously prevent the absorption of permeates, particularly water from the surrounding atmosphere.

Preferably, the getter material is contained in a layer arranged between the substrate layer and the adhesive compound.

Of course, embodiments of the adhesive tape used in the invention already disclosed in the description of the method according to the invention also apply to the adhesive tape according to the invention, provided they are not in conflict with the latter. In particular, the adhesive compound of the adhesive tape according to the invention is therefore a reversibly configured adhesive compound. Conversely, embodiments of the adhesive tape according to the invention also simultaneously constitute possible embodiments of the adhesive tape that can be used in the method according to the invention.

Provided that getter material is present in a layer arranged between the substrate layer and the adhesive compound, this layer may contain the getter material in a matrix, e.g. as a dispersed material. However, the layer may also be formed from the getter material itself and thus consist thereof. The substrate layer may also contain the getter material or be formed by the getter material.

In an embodiment of the adhesive tape according to the invention, the getter material is arranged in a layer between the substrate layer and the adhesive compound and/or contained in the adhesive compound as a dispersed phase. The term "as a dispersed phase" is understood to mean that the getter material is finely distributed in the corresponding layer(s) of the adhesive tape. As a rule, there are no restrictions on the shape and size of the getter material particles—other than the limitations inherent in the structure and function of the adhesive tape or layer, of course. The characteristic "contained as a dispersed phase" includes a molar dispersion and thus a true (molecular) solution of the getter material in the material of the layer in question, as well as a dispersion of getter material primary particles, getter material aggregates, and getter material agglomerates.

Preferably, the getter material is contained in the adhesive compound as a dispersed phase.

In addition, the characteristic of being "contained as a dispersed phase" also means that said getter material does not constitute a discrete, continuous layer, but is generally present in the form of multiple distributed particles. However, it does not mean that an ideal or statistical distribution of the getter material particles in the layer must be present. For example, the getter material particles may by all means be concentrated in certain areas within the layer, or certain areas of a getter-containing layer of the liners may also be free of getter material.

The distribution of the getter material as a dispersed phase in a layer of the adhesive tape is more advantageous than a continuous, discrete getter material layer because the specific surface for absorbing permeates is larger in the case of a continuous layer, and this therefore allows higher absorption capacity for permeates to be achieved.

As a rule, the particle size of the getter material is limited by the requirements imposed by the thickness the respective layer containing it. One can therefore consider about 200 µm to be the upper limit of particle size, but getter material in the form of particles having a grain size of at most 50 µm should preferably be used.

The adhesive tape according to the invention may by all means contain multiple layers, e.g. a substrate layer and the adhesive layer, and optionally also additional layers that contain the same or also different getter material(s).

Preferably, the getter material is in the form of particles with a particle size distribution in which a maximum of 1 vol. % of the getter material exceeds the mean layer thickness of the getter-material-containing layer. This is advantageous in that the getter particles do not protrude from the respective layer and have a strongly negative effect on surface properties. In a particularly preferred embodiment, all of the getter material contained in the adhesive tape according to the invention is present in a particle size distribution in which a maximum of 1 vol. % of the getter material exceeds the mean layer thickness of the respective getter-material-containing layer.

In an alternative preferred embodiment, the getter material is present in the form of particles in a particle size distribution in which at least 10 vol. % of the material exceeds the mean layer thickness of the getter-material-containing layer. This leads to a rough surface and can improve the anchoring of the various layers in the layered composite of the adhesive tape or increase the reversibility on the flat structure. If these particles are arranged in the adhesive layer that is in contact with the flat structure, they are covered by the adhesive compound to a lesser extent and therefore have virtually direct contact with the flat structure, and can thus more efficiently bind permeates. Particularly preferably, the entire getter material contained in the adhesive tape according to the invention is present in a particle size distribution in which at least 10 vol. % of the material exceeds the mean layer thickness of the respective getter-material-containing layer.

"Particles" are understood within the meaning of DIN 53206-1:1972-08 to refer to primary particles, aggregates, and agglomerates of the getter material or getter materials. "Particle size" is understood to refer to the maximum extension of a particle. Determination of particle size is preferably conducted by laser diffraction according to ISO 13320 (with agglomerates, but not aggregates being dispersed in the dispersion step), but other methods known to the person having ordinary skill in the art are also suitable.

Particularly preferably, all of the getter materials are present in the form of nanoscale particles, i.e. their maximum extension in at least one dimension is less than 500 nm, and particularly preferably less than 200 nm, e.g. less than 100 nm.

Examples of such getter materials include dispersed pyrogenic silica such as Aerosil manufactured by Evonik, calcium oxide nanopowder manufactured by Sigma-Aldrich, calcium chloride CA-CI-02-NP manufactured by American Elements (Los Angeles), Nanozeolite LTA or FAU manufactured by Nanoscape (Planegg-Martinsried), or nanoscale zeolite Lucidot NCL 40 manufactured by Clariant (Frankfurt).

In a further embodiment, the adhesive tape according to the invention comprises at least one layer of a getter material arranged between the substrate layer and the adhesive compound.

The getter material layer is preferably configured as a cohesive, continuous, and uninterrupted layer. However, it can also be present as an interrupted layer or present holes. According to the invention, it is possible to apply a continuous-surface or pierced layer of powdered getter material to another layer provided in the structure of the adhesive tape, e.g. to a substrate material, and for example bond it to the layer material by means of a thermal and/or mechanical process such as hot rolling. A pierced layer offers the advantage that allowed permeates can more easily pass through the layer, while permeates to be bound are trapped. Moreover, for example, a pierced layer composed of particles has a higher surface than a continuous-surface smooth layer, so the sorption capacity of the material can better manifest itself.

The thickness of the getter material layer depends in particular on the desired absorption capacity for the respective permeates. The minimum thickness of a permeable layer of a getter material having a high absorption capacity, for example a calcium layer, is to be considered the lower limit, which can be estimated to be about 20 nm. The thickness of a film consisting of a metallic getter material, e.g. a barium-zinc-alloy, whose stiffness still allows the adhesive tape to be wound is to be considered the upper limit. This layer thickness can be estimated to be about 100 μm.

The getter material layer is preferably composed of the pure getter material. For example, this can be a vapor-deposited or sputtered layer of a getter material. In a further embodiment, at least one other material is dispersed in the getter layer. An example of this other material is a gas, so that the getter layer is configured in a particularly advantageous manner as a foam, in particular an open-cell foam. This offers the advantage of a particularly large active surface of the getter layer. Materials in solid or liquid form may also be dispersed in the getter material layer. For example, these may be materials that bind to a getter material that becomes liquid as it absorbs permeate, e.g. lithium chloride, or to released gases, e.g. hydrogen in the reaction of barium with water. Pore-forming agents, which are removed from the getter material layer after the getter material is formed, may constitute the material dispersed in the getter layer. Examples of these are organic materials that are first incorporated into a getter material layer by electrochemical deposition, and are then dissolved out in a subsequent step, thus leaving a porous getter material structure.

A getter material that is dispersed (as a dispersed phase) in a layer of the adhesive tape does not constitute a "layer of a getter material" within the meaning of the invention. A "layer of a getter material" according to the invention is present only if the layer is essentially formed by the getter material itself, e.g. as the exclusive material of the layer or as a continuous phase of a dispersion. Percolated particles are also considered to be a continuous phase of a dispersion within the meaning of the invention. "Percolated particles" is understood to refer to particles that interact with one another in such a manner as to form contiguous areas or clusters. As the presence of percolation cannot be directly determined, as an alternative, a content of the getter material of 50% by weight in a dispersion is defined as the percolation threshold.

Advantageously, the adhesive compound of the adhesive tape according to the invention to be placed on the flat structure is provided with a liner prior to application. Particularly preferably, the liner also provides a barrier function against one or more specific permeate(s), particularly against water vapor and oxygen, so that the getter material contained in the adhesive tape is not partially or even completely saturated during the production and/or storage of the adhesive tape by permeate diffusing from the environment. A barrier function of this type may be provided by organic or inorganic materials. Preferably, a permeation barrier of the substrate layer with a barrier function or the composite of a substrate layer and a barrier should have transmission rates against water vapor (WVTR) of <1 g/($m^{2*}$d) and/or against oxygen (OTR) of <1 $cm^3$/($m^{2*}$d*bar) respectively with respect to the thickness of the substrate layer used in the flat structure, i.e. not standardized with respect to a specific thickness. In this case, WVTR is measured at 38° C. and 90% relative humidity according to ASTM F-1249 and OTR is measured at 23° C. and 50% relative humidity according to DIN 53380 Part 3.

Possible embodiments of an adhesive tape according to the invention are shown in FIGS. 1 and 2. The figures denote the following.

BRIEF DESCRIPTION OF THE DRAWINGS

FIG. 1:
10: Reversible adhesive compound
20: Layer containing getter material
30: Substrate material with WVTR<1 g/$m^2$d at 38° C. and 90% rH in relation to the thickness of the substrate material used FIG. 2:
11: Reversible adhesive compound containing getter material, wherein the adhesive compound shows a low permeation rate for the permeate to be immobilized.
30: Substrate material with WVTR<1 g/$m^2$d at 38° C. and 90% rH in relation to the thickness of the substrate material used.

A further object of the invention is the use of an adhesive tape according to the invention for removing permeates from a flat structure, preferably for at least partial removal of at least water from a flat structure.

EXAMPLE SECTION

Various adhesive tapes filled with getter material were manufactured to carry out the method.

Adhesive compound layers:

In order to produce adhesive compound layers, various adhesive compounds from a solution were applied to a conventional liner, the Silphan S75 M371 manufactured by Siliconature, by means of a laboratory application device and then dried. The layer thickness of the respective adhesive compounds after drying is indicated. Drying was carried out in all cases at 120° C. for 30 min in a laboratory drying cabinet.

| K1: Pressure-sensitive adhesive compound | | |
|---|---|---|
| 100 parts | Tuftec P 1500 | SBBS with 30 wt. % block polystyrene content from Asahi. The SBBS contains approx. 68 wt. % of two-block. |
| 100 parts | Escorez 5600 | Hydrated KW resin with a softening point of 100° C. from Exxon |
| 25 parts | Ondina 917 | White oil from paraffin and naphthene components from Shell |

A mixture of toluene and acetone in a 2:1 ratio was used as a solvent.

| K2: Reversible pressure-sensitive adhesive compound | | |
|---|---|---|
| 90 parts | Butyl 100 | Butyl rubber from Bayer, isoprene content 0.9 mol % |
| 10 parts | Hyvis 200 | Polybutene from BP Chemical |

SBP spirit was used as a solvent.

| K3: Reversible pressure-sensitive adhesive compound | | |
|---|---|---|
| 80 parts | Butyl 100 | Butyl rubber from Lanxess, isoprene content 0.9 mol % |
| 10 parts | Oppanol B 150 | Polyisobutylene (PIB) from BASF, Mn = 425,000 g/mol |
| 10 parts | Regalite R 1100 | Hydrated hydrocarbon resin from Eastman with a softening point of 100° C. |

SBP spirit was used as a solvent.

| K4: Reversible pressure-sensitive adhesive compound | | |
|---|---|---|
| 100 parts | Levapren 700 | Polyethylene vinyl acetate from Bayer, vinyl acetate content 70 wt. %. |
| 30 parts | Levapren 800 | Polyethylene vinyl acetate from Bayer, vinyl acetate content 80 wt. %. |

-continued

| K4: Reversible pressure-sensitive adhesive compound | | |
|---|---|---|
| 25 parts | Levapren 450 | Polyethylene vinyl acetate from Bayer, vinyl acetate content 45 wt. %. |

Methylethylketone was used as a solvent.

| K5: Radiation-activated reversible pressure-sensitive adhesive compound | |
|---|---|
| 59 parts | Acrylate copolymer consisting of 56 wt. % butyl acrylate, 40 wt. % methyl acrylate, 2 wt. % acrylic acid, and 2 wt. % benzoin acrylate produced by radical polymerization according to the method disclosed in DE 195 20 238 C2 |

Example 1

| | | |
|---|---|---|
| 0.4 parts | Aluminum-acetyl acetonate | |
| 28 parts | Ebecryl 220 hexafunctional, aromatic urethane-acrylate oligomer from Cytec | |
| 12 parts | PETIA pentaerythritol tri-tetraacrylate from Cytec with a tri/tetra ratio of approx. 1:1 | |

| K6: Reversible pressure-sensitive adhesive compound | | |
|---|---|---|
| 85 parts | Oppanol B 150 | PIB from BASF, Mn = 425,000 g/mol |
| 15 parts | Oppanol B 50 | PIB from BASF, Mn = 120,000 g/mol |

SBP was used as a solvent.

Storage modulus and loss modulus of the reversible pressure-sensitive adhesive compounds were determined in an oscillation shear test (dynamic mechanical analysis, DMA) under torsional loading at a temperature of 23° C. and a frequency of 0.01 rad/s.

Moreover, water vapor transmission rate (WVTR) was measured at 38° C. and 90% relative humidity according to ASTM F-1249. The indicated value is the mean value of two measurements.

Adhesion to steel was determined analogously to ISO 29862 (Method 3) at 23° C. and 50% relative humidity at a detachment rate of 300 mm/min and detachment angle of 180°. An etched PET film with a thickness of 50 μm was used as a reinforcing film, of the type available from Coveme (Italy). Bonding of the measurement strip was conducted using a roller applicator at a temperature of 23° C. The adhesive tapes were immediately pulled off after application. The indicated value is the mean value of three measurements.

| Designation | WVTR [g/m² d] | Adhesion/steel [N/cm] |
|---|---|---|
| K1 (not reversible) | 68 | 7.1 |
| K2 | 44 | 1.7 |
| K3 | 18 | 2.2 |
| K4 | 155 | 1.2 |
| K5 | 569 | 1.8 before/0.23 after UV |
| K6 | 6 | 1.0 |

The values determined for adhesion to steel show that compounds K2-K6 are reversible pressure-sensitive adhesive compounds.

A laminate of aluminum foil and BOPP manufactured by Novelis, Berlin, was used as a substrate material for the adhesive tapes. The adhesive compound was coated from the solution onto the aluminum side of the composite substrate and dried.

The following getter materials were used:

| Designation | Description | Commercial name | Supplier |
|---|---|---|---|
| G1 | Calcium oxide | Calcium oxide nanopowder | Sigma-Aldrich |
| G2 | Zeolite 3A | Purmol 3 STH | Zeochem |

The getter materials were incorporated into the adhesive compound solutions using a high-speed dispersion disk of a laboratory agitator. The adhesive compound solutions were first dried using zeolite beads measuring approx. 1 mm, which were again filtered out before the coating process.

Figure 1:
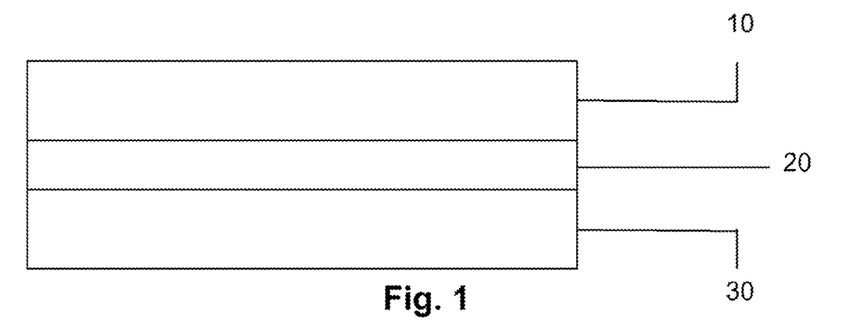
Figure 2:
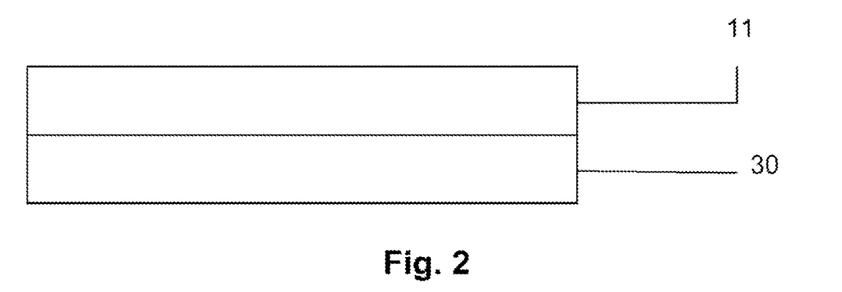

Table 1 shows an overview of the manufactured getter material-containing adhesive tapes according to FIG. 2 (T1-T11, T13, T14). In this case, in contrast to the description of FIG. 2, the adhesive compounds K1, K4 and K5 show a WVTR of more than 50 g/(m²*d). Only adhesive tape 12 (T12) was manufactured according to FIG. 1, wherein the getter material in adhesive compound 1 was dispersed and used as a "layer containing getter material (20)" in a thickness of 50 μm. Adhesive compound 4 was used as an adhesive compound (10).

TABLE 1

Getter material-filled adhesive tapes:

| Designation | Adhesive compound | Getter material | Content of getter [wt. %] | Thickness of adhesive compound layer [μm] |
|---|---|---|---|---|
| T1 | K2 | G1 | 10 | 75 |
| T2 | K2 | G1 | 20 | 75 |
| T3 | K2 | G1 | 40 | 75 |
| T4 | K3 | G1 | 20 | 75 |
| T5 | K4 | G1 | 20 | 75 |
| T6 | K5 | G1 | 20 | 50 |
| T7 | K2 | G2 | 20 | 75 |
| T8 | K2 | G2 | 40 | 75 |
| T9 | K3 | G2 | 20 | 75 |
| T10 | K4 | G2 | 20 | 75 |
| T11 | K5 | G2 | 20 | 50 |
| T12 | K1/K4 | G2 in K1 | 20 | K1: 50; K2: 20 |
| T13 | K1 | G2 | 20 | 75 |
| T14 | K6 | G2 | 20 | 50 |

As an additional getter material-filled adhesive tape, adhesive compound K1, containing no getter material, was equipped in a dry layer thickness of 50 μm with a getter-material-containing liner.

In order to produce this liner, a laboratory laminating device was used to laminate an adhesive compound of the adhesive tape T13 with a conventional liner on its non-separating side, and the other side of the adhesive compound was covered with a BOPP film. A conventional liner of the model SILPHAN S36 M372 (36 μm PET), available from Siliconature, Italy, was used. BOPP film with a thickness von 36 μm made by Pao-Yan, Taiwan, was used as a covering.

The getter material-containing liner obtained in this manner was applied to adhesive compound K1 containing no getter material. This adhesive tape is referred to below as T15.

An approx. 30 µm thick polyester film coated with an inorganic barrier layer (GX-P-F made by Toppan Printing) was used as a flat structure from which permeate was to be removed. The film was conditioned prior to use for 24 hours at 23° C. and 50% rH.

The adhesive tapes produced containing getter material were laminated onto the non-inorganically coated side of the polyester film immediately after drying. With adhesive tapes T11 and T14, an additional test was conducted in which the adhesive tapes were first stored open for 1 hour at 23° C. and 50% rH and only then laminated onto the polyester film.

The composites produced in this manner were stored for 14 days at 23° C. in an impermeable package (sealed in an aluminum composite film). The samples were then removed from their package in a glove box (atmosphere: water vapor<5 ppm, oxygen<1 ppm), and the respective adhesive tapes were detached from the polyester film. The polyester film was immediately sealed in a glass container for water content determination. Samples with adhesive compound K5 were first crosslinked in the glove box with a UV Cube made by Hoenle with a UV-C dose of 80 mJ/cm$^2$ (250-260 nm-band) in order to restore reversibility. For samples with adhesive tape T15, only the getter-material-containing liner was removed, and the water content of the remaining composite of adhesive compound K1 and polyester film was determined.

Water Content Measurement

Water content was determined according to DIN 53715 (Karl Fischer titration). Measurement was conducted on a Karl-Fischer Coulometer 851 in combination with an oven sampler (oven temperature 140° C.). Triple determination was carried out with an initial weight of approx. 0.3 g. The arithmetic mean of the measurements is given as the water content.

Moreover, the reversibility of the adhesive compounds was subjectively assessed on detaching the adhesive tape from the barrier film.

Table 2 shows the results:

TABLE 2

Results of the drying process and reversibility

| Designation of tape applied and then removed | Water content of flat structure [ppm] | Reversibility<br>++ very easily detachable<br>+ easily detachable<br>o detachable with some effort<br>— detachable with much effort |
|---|---|---|
| — (conditioned film) | 3670 | n.a. |
| T1 | 57 | + |
| T2 | 7 | + |
| T3 | <2* | ++ |
| T4 | 10 | + |
| T5 | 4 | + |
| T6 | 23 | ++ |
| T7 | 12 | + |
| T8 | <2* | ++ |
| T9 | 9 | + |
| T10 | 7 | + |
| T11 | 4 | ++ |
| T12 | 7 | + |
| T13 | 10 | — |
| T14 | 13 | ++ |
| T15 | 13 | only liner detached |
| T11 - conditioned 1 h | 1540 | ++ |
| T14 - conditioned 1 h | 22 | ++ |

*Measurement limit

The results show that outstanding drying results can be achieved with the method according to the invention.

Surprisingly, the tests conducted with an adhesive tape according to the invention with a reversible adhesive compound (T1-T12, T14) do not show impaired release of permeate compared to the example using a conventional adhesive compound (T13), although the person having ordinary skill in the art would have expected that a reversible adhesive compound, because of its lower flowability, would establish less contact with the adhesive substrate and that the material transport would therefore be reduced.

Both of the getter materials used are found to be suitable. Surprisingly, tests using a small amount of getter material in the adhesive tape (T2, T7) show only a slight decrease in efficacy compared to those conducted with a higher degree of filling (T3, T8).

Surprisingly, an adhesive tape with the structure according to FIG. 1 (T12), in which material transport must first take place through a low-permeability layer, also showed no noteworthy impairment of properties. This also applies to the configuration of the adhesive tape with a getter material-containing liner (T15), in which the permeate must first pass through the substrate film of the liners. After removal of the liners, both the adhesive structure and the flat structure are dried. The flat structure can show bonding capacity because of the adhesive compound remaining on it, without requiring application of an additional adhesive compound as in the other examples. For example, this type of flat structure composed of a dried barrier film and an also dry pressure-sensitive adhesive compound such as in Example T15 can advantageously be used to encapsulate an electronic device.

Compared to the method with the adhesive tapes T11 and T14, which are laminated immediately or after one-hour conditioning onto the barrier substrate, the advantage of an adhesive compound with a low permeation rate can be seen: T11 shows a substantial reduction in drying performance after conditioning, while the adhesive tape T14 with the considerably less permeable shows virtually no decrease in drying performance.

The invention claimed is:

1. A method for removing permeates from a flat structure, comprising
   (A) gluing an adhesive tape containing at least one getter material to the flat structure,
   (B) storing a composite formed by the adhesive tape and the flat structure obtained in step (A), and
   (C) removing at least a part of the adhesive tape from the flat structure,
   wherein the adhesive tape can at least partially absorb at least one permeate from the flat structure.

2. The method of claim 1, comprising removing the adhesive tape from the flat structure.

3. The method of claim 2, wherein an adhesive compound placed on the flat structure of the adhesive tape is a pressure-sensitive adhesive compound, an activatable adhesive compound, an activatable pressure-sensitive adhesive compound, reversibly configured, or free of adhesive resins.

4. The method of claim 2, wherein the adhesive tape is capable of at least partially absorbing water from the flat structure.

5. The method of claim 2, wherein the getter material is selected from the group consisting of barium, calcium, calcium sulfate, calcium chloride, calcium oxide, sodium sulfate, potassium carbonate, copper sulfate, magnesium perchlorate, magnesium sulfate, lithium chloride, silicic acids, zeolites, and a mixture of two or more of the above substances.

6. The method of claim 2, wherein the getter material is selected from the group consisting of calcium oxide, calcium sulfate, calcium chloride, pyrogenic silicic acids, zeolites, and a mixture of two or more of the above substances.

7. The method of claim 2, wherein the flat structure is found on/in feedstocks or intermediate products in the manufacture of electronic structures, anodes or cathodes, conductive layers or conductive paths, hole injection layers, organic light-emitting or absorbing layers, and/or medicated patches.

8. The method of claim 1, wherein an adhesive compound placed on the flat structure of the adhesive tape is a pressure-sensitive adhesive compound or an activatable adhesive compound.

9. The method of claim 1, wherein an adhesive compound placed on the flat structure of the adhesive tape is an activatable pressure-sensitive adhesive compound.

10. The method of claim 1, wherein an adhesive compound placed on the flat structure of the adhesive tape is reversibly configured.

11. The method of claim 1, wherein the adhesive tape is capable of at least partially absorbing water from the flat structure.

12. The method of claim 1, wherein the getter material is selected from the group consisting of barium, calcium, calcium sulfate, calcium chloride, calcium oxide, sodium sulfate, potassium carbonate, copper sulfate, magnesium perchlorate, magnesium sulfate, lithium chloride, silicic acids, zeolites, and a mixture of two or more of the above substances.

13. The method of claim 1, wherein the getter material is selected from the group consisting of calcium oxide, calcium sulfate, calcium chloride, pyrogenic silicic acids, zeolites, and a mixture of two or more of the above substances.

14. The method of claim 1, wherein the flat structure is found on/in feedstocks or intermediate products in the manufacture of electronic structures, anodes or cathodes, conductive layers or conductive paths, hole injection layers, organic light-emitting or absorbing layers, and/or medicated patches.

15. The method of claim 1, wherein the adhesive tape comprises a layer of getter material containing the at least one getter material, and an adhesive compound layer comprising an adhesive compound, arranged adjacent to the layer of getter material.

16. The method of claim 15, wherein the layer of getter material is present as an interrupted layer or contains holes.

17. The method of claim 1, wherein the adhesive tape comprises an adhesive compound layer comprising an adhesive compound, and the at least one getter material is contained in said adhesive compound layer.

18. The method of claim 17, the at least one getter material is contained in said adhesive compound layer as a dispersed phase.

* * * * *